United States Patent Office 3,027,297
Patented Mar. 27, 1962

3,027,297
3,4-DIBROMOANILINE NEMATOCIDE
John H. Wotiz, Mentor, Ohio, assignor to Diamond Alkali Company, Cleveland, Ohio, a corporation of Delaware
No Drawing. Filed Dec. 2, 1959, Ser. No. 856,645
2 Claims. (Cl. 167—30)

This invention relates to 3,4-dibromoaniline, its preparation and utilization.

The compound 3,4-dibromoaniline has the formula:

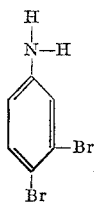

and can conveniently be prepared by reacting 1,2,4-tribromo benzene with sodium amide.

It has been found that 3,4-dibromoaniline exhibits a high degree of biological activity and is especially useful as an active ingredient in various applications where biological activity is required, e.g., in the field of parasiticides, e.g., nematocides and fungicides.

In using the 3,4-dibromoaniline of this invention as a nematocide and fungicide, it can be applied as such or it can be extended with a liquid or solid diluent. The compound of this invention can, for example, be combined or formulated into suitable compositions for spraying or drenching or, if desired, formulated as an emulsifiable concentrate. Alternatively, the compound can, of course, be formulated into appropriate use compositions by mixing a toxic amount thereof with a conditioning agent of the kind used and referred to in the art of the pest control adjuvant.

Nematocidal and fungicidal compositions embodying the invention can be prepared in the form of solids or liquids. Solid compositions, preferably in the form of wettable powders, are compounded to give homogeneous free-flowing powder by mixing the active ingredient with finely-divided solids, Attaclays, diatomaceous earth, synthetic fine silica or flours, such as walnut shell, redwood, soybean, cotton seed flour or other solid conditioning agents or carriers of the kind conventionally employed in praparing pest control compositions in solid or liquid form.

Even more preferable among solid compositions, in some instances, are granules or pellets when the application is primarily to the soil. Granules may be prepared by impregnating granular diluents such as granular Attaclay or may be made by first extending powdered solid with powdered diluent and subsequently granulating. Pellets are made by extruding moistened, powdered mixtures under high pressure through dies.

Liquid compositions of the invention can be prepared by mixing the active ingredient with a suitable liquid diluent medium. The resulting composition can be in the form of either a solution or suspension of the active ingredient.

The nematocidal and fungicidal compositions of the invention, whether in the form of solids or liquids, for most applications may also include a surface-active agent of the kind sometimes referred to in the art as a wetting, dispersing or emulsifying agent. These agents, which will be referred to hereinafter more simply as surface-active agents, cause the compositions to be easily dispersed in water to give aqueous sprays.

The surface-active agents employed can be of the anionic, cationic or nonionic type and include, for example, sodium and potassium oleate, the amine salts of oleic acids such as morpholine and dimethylamine oleates, the sulfonated animal and vegetable oils such as sulfonated fish and castor oils, sulfonated petroleum oils, sulfonated acyclic hydrocarbons, sodium salt of lignin sulfonic acid (goulac), alkyl naphthalene sodium sulfonate and other wetting, dispersing and emulsifying agents such as those listed in articles by McCutcheon in "Soap and Chemical Specialties," vol. 31, Nos. 7–10 (1955), including, for example, the material known as Triton X–155 (100% alkylaryl polyether alcohol—U.S. Patent No. 2,504,064).

Generally, the surface-active agent will not comprise more than about 5% to 15% by weight of the composition depending, of course, upon the particular surface-active agent, the system in which it is placed, and the result desired; in certain compositions, the percentage will be 1% or less. Usually, the minimum lower concentration will be 0.1%.

The active compound is, of course, applied in amount sufficient to exert the desired nematocidal or fungicidal action. The amount of the active ingredient present in the compositions as actually applied for killing nematodes and controlling fungi will vary with the manner of application, the particular nematodes or fungi for which control is sought, the purposes for which the application is being made, and like variables. In general, however, the biologically active compositions will contain from about 0.5% to 85% by weight of the active ingredient.

Fertilizer materials, herbicidal agents, and other pest control agents such as insecticides and fungicides can be included in the biologically active compositions of the invention if desired.

In order that those skilled in the art may more completely understand the present invention and the preferred methods by which the same may be carried into effect, the following specific examples are offered:

EXAMPLE 1

*Preparation of 3,4-dibromoaniline.*—A one-liter, three-necked flask is charged with 500 ml. of liquid ammonia. 94.5 g. (0.3 mol) of 1,2,4-tribromo benzene is melted and mixed with 100 ml. of warm petroleum ether to prevent solidification. This is added dropwise into the agitated liquid ammonia at −33° C. 23.4 g. (0.62 mol) of powdered $NaNH_2$ is slowly added to the mixture at −33° C. and allowed to stir overnight. The liquid $NH_3$ is evaporated and the residue is hydrolyzed with 200 ml. of distilled water. The water phase is extracted with ten 80 ml. portions of ethyl ether, and the combined ether extract is dried with $CaCl_2$ and filtered. This dried ether extract is saturated with anhydrous HCl and the precipitated dibromoaniline hydrochloride filtered and dried. The dry material is powdered and dissolved in one liter of hot distilled water. The hot solution is allowed to cool and filtered. The filtrate is mixed with 70 ml. of 5 N NaOH solution to precipitate the crude product which is separated by filtration. The crude product is recrystallized from hot petroleum ether and dried. The crystallized product melts at 80° to 81° C.; its identity as 3,4-dibromoaniline is confirmed by comparison with a known sample.

EXAMPLE 2

In showing the nematocidal activity of 3,4-dibromoaniline, composted greenhouse soil in one-half gallon, glazed crocks is infested with 3 to 5 g. of knotted or galled tomato roots containing root knot nematodes, Meloidogyne species. Treatment at various rates, equivalent to 64 lbs., 32 lbs. and 16 lbs./acre in a series of tests (96, 48 and 24 mg./crock), is effected by mixing the test chemical intimately with the soil. An indicator crop of three tomatoes are transplanted into treated crocks and into infested and non-infested check crocks 4 to 7 days after treatment. The degree of infection which is measured by the number and size of galls formed compared to checks is used as an index of nematocidal activity of the test material. Test results indicate 100% control of the root knot nematode at a concentration of 64 lbs./acre, 80% control at 32 lbs./acre and 50% control at 16 lbs./acre.

EXAMPLE 3

A tomato foliage disease test is conducted measuring the ability of 3,4-dibromoaniline to protect tomato foliage against infection by the early blight fungus, *Alternaria solani*. Tomato plants 5 to 7 inches high of the variety Bonny Best are employed. 100 ml. of the test formulation (2000 p.p.m. 3,4-dibromoaniline—5% acetone—0.01% Triton X-155—balance water) are sprayed on the plants at 40 lbs. air pressure while the plants are being rotated on a turntable in a spray chamber. After the spray deposit is dry, the treated plants and comparable untreated controls are again sprayed as described above with a sporangial suspension containing approximately 20,000 conidia of *A. solani* per ml. for 30 seconds at 20 lbs. The plants are held in a 100% humid atmosphere for 24 hours at 70° F. to permit spore germination and infection. One day after removal from the humid atmosphere, lesion counts are made on the three uppermost fully expanded leaves. Data based on the number of lesions obtained on the control plants shows 100% disease control.

EXAMPLE 4

Fungicidal utility is demonstrated by the ability of 3,4-dibromoaniline to protect tomato plants against the late blight fungus, *Phytophthora infestans*. The method employs tomato plants 5 to 7 inches high of the variety Bonny Best. 100 ml. of the test formulation (2000 p.p.m. 3,4-dibromoaniline—5% acetone—0.01% Triton X-155—balance water) are sprayed on the plants at 40 lbs. air pressure while the plants are being rotated on a turntable in a spray chamber. After the spray deposit is dry, the treated plants and comparable untreated controls are again sprayed as described above with a sporangial suspension containing approximately 150,000 sporangia of *P. infestans* per ml. for 30 seconds at 20 lbs. The plants are held in a 100% humid atmosphere for 24 hours at 60° F. to permit spore germination and infection. After 2 to 4 days, lesion counts are made on the three uppermost fully expanded leaves. Comparing the number of lesions on the test plants and control plants shows 100% disease control on the test plants.

EXAMPLE 5

Part A

*Preparation of 3,5-dibromoaniline.* — Employing the method of Example 1, 3,5-dibromoaniline is prepared from 1,3,5-tribromobenzene and $NaNH_2$ in liquid ammonia at a temperature of $-33°$ C.

Part B

In testing the nematocidal activity of 3,5-dibromoaniline, the procedure of Example 2 is followed except that the treatment is at a rate equivalent to 128 lbs./acre (192 mg./crock). Test results indicate that at this concentration 3,5-dibromoaniline exhibits no control over the root knot nematode.

By comparison of the results of Example 2 and those of Example 5, Part B, it is readily seen that the position of the bromine atoms on the benzene ring is quite critical with regard to the biological activity, especially against nematodes, exhibited by the respective compounds. Whereas the dibromoaniline, having bromine atoms in the three and four positions, exhibits excellent nematocidal activity at 64 lbs. per acre, the isomer, having bromine atoms in the three and five positions, exhibits no noticeable activity at 128 lbs. per acre against the same type of nematodes.

It is to be understood that although the invention has been described with specific reference to particular embodiments thereof, it is not to be so limited since changes and alterations therein may be made which are within the full intended scope of this invention as defined by the appended claims.

What is claimed is:

1. The method of killing nematodes which comprises applying to nematode-infested soil a composition of matter containing as an essential active ingredient 3,4-dibromoaniline present in a nematocidal amount.

2. A nematocidal composition of matter containing as an essential active ingredient 0.5% to 85% by weight 3,4-dibromoaniline, 0.1% to 15% by weight surface active agent, and the balance an adjuvant.

References Cited in the file of this patent

UNITED STATES PATENTS 1,947,926　　Steindorff _____ Feb. 20, 1934

OTHER REFERENCES

King: U.S. Dept. Agr. Handbook No. 69, 1954, page 48.

Frear: A Catalogue of Insecticides and Fungicides (1948), vol. I, page 147; vol. II, page 44.

Parnell: Brit. J. Pharmacol., vol. 7, pp. 509–533 (page 516 relied on), 1952.